United States Patent
McDaniel et al.

(10) Patent No.: US 7,246,102 B2
(45) Date of Patent: Jul. 17, 2007

(54) METHOD OF IMPROVING THE LOOKUP PERFORMANCE OF THREE-TYPE KNOWLEDGE BASE SEARCHES

(75) Inventors: Betty A. McDaniel, Austin, TX (US); William Edward Baker, Orlando, FL (US); Narender R. Vangati, Round Rock, TX (US); Mauricio Calle, Austin, TX (US); James T. Kirk, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 719 days.

(21) Appl. No.: 10/037,040

(22) Filed: Dec. 21, 2001

(65) Prior Publication Data
US 2003/0120621 A1  Jun. 26, 2003

(51) Int. Cl.
G06F 17/00 (2006.01)
G06F 7/00 (2006.01)
G06N 5/02 (2006.01)
H04L 12/28 (2006.01)

(52) U.S. Cl. ............ 706/50; 706/48; 706/934; 707/100; 707/101; 370/351

(58) Field of Classification Search .......... 706/10, 706/26–27, 45–48, 50; 707/1, 2–3, 100–102; 709/242, 213; 715/853; 370/911, 238, 351, 370/389, 400–401; 711/100–101, 117–119, 711/122, 136, 147–148, 151, 153; 341/50, 341/79
See application file for complete search history.

(56) References Cited

U.S. PATENT DOCUMENTS 4,611,272 A * 9/1986 Lomet ...................... 707/3
5,295,261 A * 3/1994 Simonetti .................. 707/2
5,404,513 A * 4/1995 Powers et al. ............ 707/102
5,463,777 A * 10/1995 Bialkowski et al. ....... 707/102
5,535,365 A * 7/1996 Barriuso et al. ........... 711/155
5,630,125 A * 5/1997 Zellweger ............... 707/103 R
5,813,001 A * 9/1998 Bennett .................... 706/50
5,894,586 A * 4/1999 Marks et al. .............. 710/28
5,930,805 A * 7/1999 Marquis .................. 707/201
5,946,679 A * 8/1999 Ahuja et al. ............... 707/3
5,963,675 A * 10/1999 van der Wal et al. ..... 382/260
5,968,109 A * 10/1999 Israni et al. ............. 701/208

(Continued)

FOREIGN PATENT DOCUMENTS

WO   WO 03/030019 A3   4/2003

OTHER PUBLICATIONS

Demuynck et al; Bmad-tree: an efficient data structure for parallel processing; Eighth IEEE Symposium on Parallel and Distributed Processing; Oct. 23-26, 1996; pp. 384-391.*

*Primary Examiner*—David Vincent
*Assistant Examiner*—Benjamin Buss

(57) ABSTRACT

A decision tree, representing a knowledge base, is segmented into at least two decision tree portions. The lower portion includes the tree entry point and is stored in a memory element with a faster access time than the upper portion, which includes the terminating element of the decision tree. Thus during the process of reading the tree entries for comparing them with the search object, the search entries in the lower portion of the tree can be read faster than the search entries in the upper portion, resulting in a faster traversal through the entire decision tree.

34 Claims, 3 Drawing Sheets

U.S. PATENT DOCUMENTS

| | | | |
|---|---|---|---|
| 5,983,224 A * | 11/1999 | Singh et al. | 707/6 |
| 6,061,712 A * | 5/2000 | Tzeng | 709/202 |
| 6,226,714 B1 * | 5/2001 | Safranek et al. | 711/119 |
| 6,247,016 B1 | 6/2001 | Rastogi et al. | |
| 6,260,044 B1 * | 7/2001 | Nagral et al. | 707/102 |
| 6,266,706 B1 | 7/2001 | Brodnik et al. | 709/242 |
| 6,304,260 B1 | 10/2001 | Wills | |
| 6,381,607 B1 * | 4/2002 | Wu et al. | 707/100 |
| 6,516,319 B1 * | 2/2003 | Benayoun et al. | 707/100 |
| 6,563,952 B1 * | 5/2003 | Srivastava et al. | 382/225 |
| 6,571,238 B1 * | 5/2003 | Pollack et al. | 707/5 |
| 6,625,591 B1 * | 9/2003 | Vahalia et al. | 707/1 |
| 6,636,802 B1 * | 10/2003 | Nakano et al. | 701/208 |
| 6,662,184 B1 * | 12/2003 | Friedberg | 707/100 |
| 6,678,772 B2 * | 1/2004 | McKenney | 710/200 |
| 6,766,424 B1 * | 7/2004 | Wilson | 711/148 |
| 6,772,223 B1 * | 8/2004 | Corl et al. | 709/238 |
| 6,839,739 B2 * | 1/2005 | Wilson | 709/213 |
| 6,961,821 B2 * | 11/2005 | Robinson | 711/133 |
| 2002/0049824 A1 * | 4/2002 | Wilson | 709/213 |
| 2002/0078284 A1 * | 6/2002 | McKenney | 710/200 |

* cited by examiner

METHOD OF IMPROVING THE LOOKUP PERFORMANCE OF THREE-TYPE KNOWLEDGE BASE SEARCHES

FIELD OF THE INVENTION

This invention relates generally to tree-based searching of a knowledge base, and more specifically, to the use of local memory to improve the speed of the searching process.

BACKGROUND OF THE INVENTION

Many different applications require a search of a large data base of elements, also referred to as a knowledge base, to locate a match with a given search object. In certain applications the search object and the elements of the knowledge base comprise a string of binary bits. An example of such an application is a bridge in a communications system.

A typical communication system includes a number of devices or nodes that communicate over a plurality of connections. The system is organized into a plurality of local connections with a limited number of nodes associated with (connected to) each local connection. A network of bridges interconnects the local connections so that each device can communicate with other devices not associated with the same local connection. The bridge for each local connection monitors input traffic from other bridges in the network to determine if traffic originating at another bridge is addressed to a node connected to it locally. In response, the bridge provides a path that allows the information to pass through to the local connection. Similarly, when information is sourced from the local connection to an external destination node, the bridge allows the information to pass from the local connection to the next bridge on the path to the destination node.

Typically, the information carried between nodes is in the form of packets of binary bits that travel from the source node to the destination node across the system. A packet typically includes bits identifying the addresses of the packet's source node and the destination node. In one addressing protocol, the address portion of the packet is 48 bits long, with the remainder of the packet comprising payload information bits.

In certain systems, a bridge monitors both internally generated traffic (i.e., traffic sourced at nodes connected directly to the bridge) and also monitors externally-generated traffic (i.e., traffic sourced at nodes external to the bridge) that is broadcast to all bridges of the network. For example, information broadcast over a local area network may not be intended for all network nodes, but is monitored by each network bridge to determine whether any of the intended destination nodes are connected to the bridge. This analysis is performed by maintaining, at each bridge, a knowledge base with an entry for each of the nodes on the bridge's local connection. Thus the bridge receives externally sourced packets and searches its knowledge base to determine whether the 48-bit destination address matches any of the node addresses located on its local connection. The destination address (i.e., the search object) could have a value of any one of $2^{48}$ or about 280 trillion possible addresses. However, the number of entries in the bridge's knowledge base will be equal only to the number of nodes connected locally to it, and therefore will be significantly less than 280 trillion.

Searching a knowledge base to determine a match to a given search object is an important requirement for many different applications. For example, the following applications rely heavily on the performance of speedy searches: data base retrieval; expert systems; robotic and state control strategy; signal recognition, including for example speech and image recognition; communications, including for example data compression and protocol processing for bridging, routing and switching applications; natural language cognitive systems; modeling operations; parsers; and compilers.

One important attribute of any searching scheme is the worst case time required to complete a search. Generally, searching schemes are implemented in a plurality of steps or cycles that each take a predetermined amount of time to complete. Thus, the maximum time to complete a search is generally reduced by minimizing the time spent at each step of the search.

A data network classification engine typically utilizes a tree search process to determine various characteristics associated with each data packet or data block that enters the network device, i.e., to classify the input data according to one or more data attributes. Since the data is conventionally presented in the form of binary bits, the classification engine compares groups of the input bits with known bit patterns, represented by entries in the tree structure. A match between the group of input bits and the bits at a tree entry directs the process to the next sequential entry in the tree. The matching processes progress through each entry of the tree until the end is reached, at which point the input bits have been characterized. Because a large number of bits must be classified in a data network, these trees can require many megabits of memory storage capacity.

The classification process finds many uses in a data communications network. The input data packets can be classified based on a priority indicator within the packet, using a tree structure where the decision paths represent the different network priority levels. Once the priority level is determined for each packet, based on a match between the input bits and the tree bits representing the available network priority levels, then the packets can be processed in priority order. As a result, the time sensitive packets (e.g., those carrying video-conference data) are processed before the time insensitive packets (a file transfer protocol (FTP) data transfer). Other packet classifications processes determine the source of the packet (for instance, so that a firewall can block all data from one or more sources), examine the packet protocol to determine which web server can best service the data, or determine network customer billing information. Information required for the reassembly of packets that have been broken up into data blocks for processing through a network processor can also be determined by a classification engine that examines certain fields in the data blocks. Packets can also be classified according to their destination address so that packets can be grouped together according to the next device they will encounter as they traverse the communications medium.

BRIEF SUMMARY OF THE INVENTION

The tree structure for performing the classification process is segregated into a plurality of memory elements, providing the processor with parallel and simultaneous access to the levels of the tree structure. According to the present invention, one or more of the lower level branches of the tree can be stored on-chip with the classification engine, (i.e., the processor) thereby reducing the read cycle time for the lower level tree entries. Advantageously, there are fewer lower level tree entries as these appear near the tree root. Therefore, the on-chip storage requirements are considerably less than the storage requirements for the entire tree.

BRIEF DESCRIPTION OF THE DRAWINGS

The present invention can be more easily understood and the further advantages and uses thereof more readily apparent, when considered in view of the description of the invention and the following figures in which.

DETAILED DESCRIPTION OF THE INVENTION

According to the teachings of the present invention, the tree structure is partitioned between one or more memory elements, such that depending on the memory elements chosen (i.e., faster memory on-chip versus slower off-chip memory) different read access times are available and thus certain tree entries, that is nodes or instructions as discussed above, are accessible faster than others.

Figure 1:
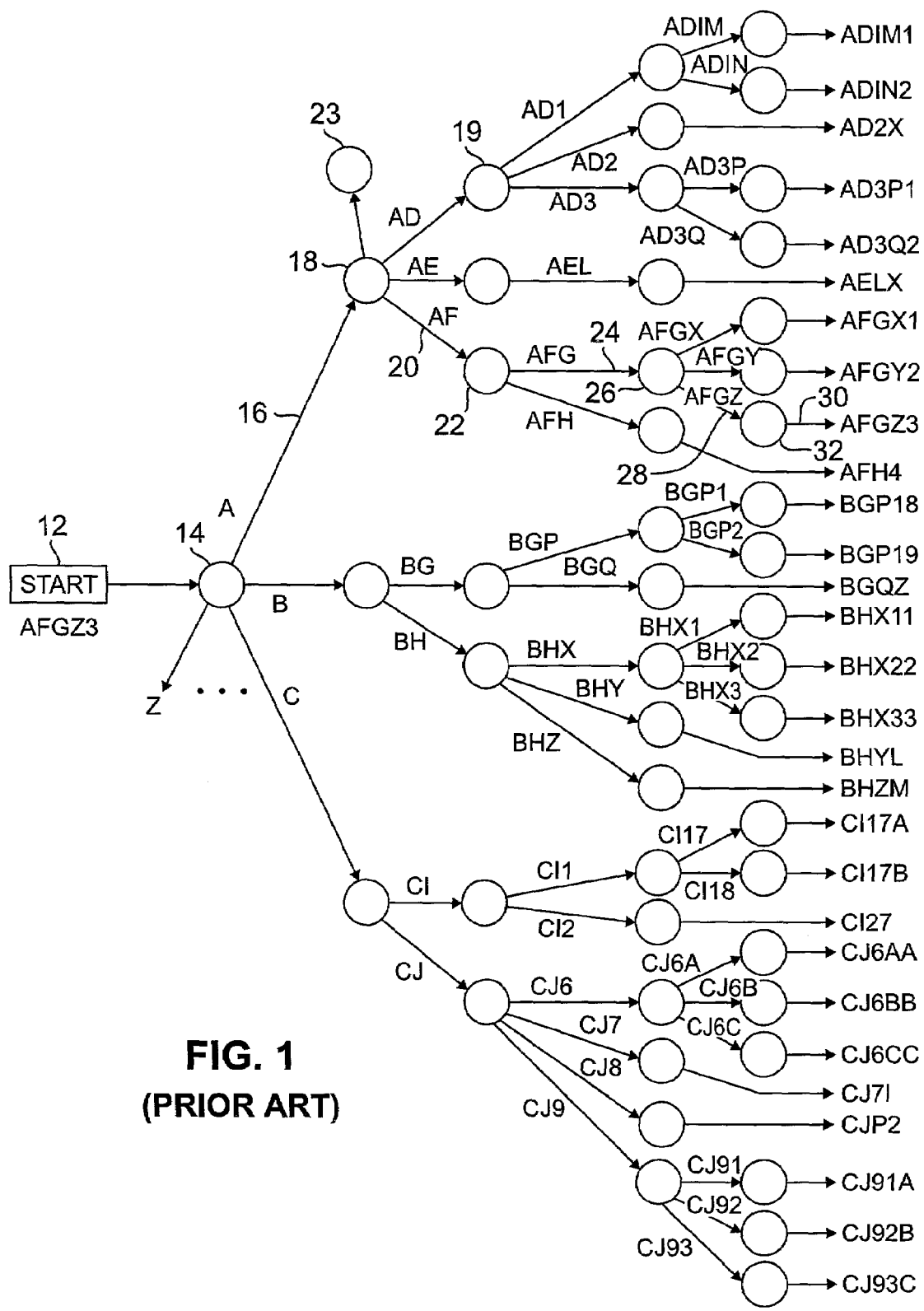
FIG. 1 is a prior art tree structure for processing an input symbol.
Figure 2:
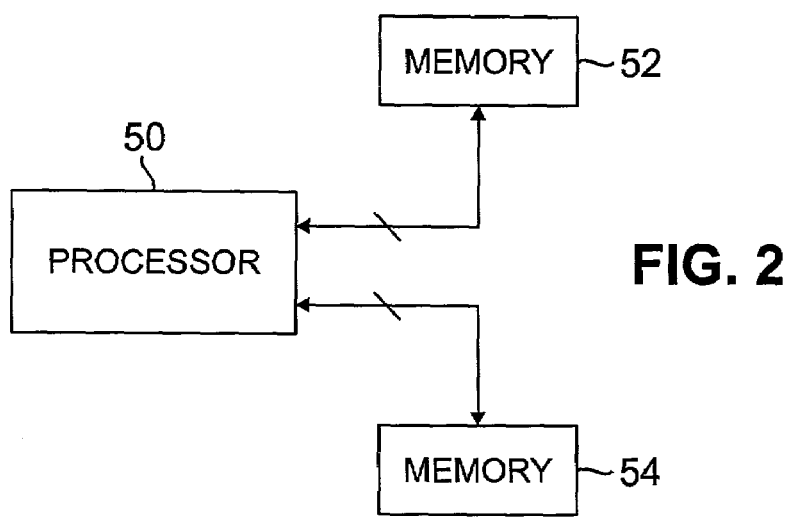
FIGS. 2 through 5 are block diagrams of the processor and memory elements according to various embodiments of the present invention.

As shown in FIG. 2, a processor 50 communicates bidirectionally with memories 52 and 54, where the instructions representing one or more tree levels are stored. For example, tree levels one (referred to as the root level), two and three of FIG. 1 are stored in the memory 52 and tree levels four and five are stored in the memory 54. If the memory 52 has a faster memory access time than the memory 54, then the instructions stored in memory 52 can be accessed faster than those in memory 54. It is known that a significant number of tree searches are terminated in the root memory or within one or two levels of the root memory. Simulation and analysis show that about 30% of the tree instructions are matched in the root tree memory. Thus if the tree root is stored in the memory 52, the process will likely converge faster.

The use of two separate memory structures is merely exemplary as additional memory structures can also be employed for storing levels of the tree. Selection of the optimum number of memory elements, the memory access time requirements of each, and the tree levels stored in each memory element can be based on the probability that certain patterns will appear in the incoming data stream. The tree levels or sections of tree levels that are followed by the most probable data patterns are stored in the memory having the fastest access time. For example, all the input patterns traverse the lower levels of the tree, thus these lower levels can be stored within a memory having a fast read cycle time to speed up the tree analysis process.

Figure 3:
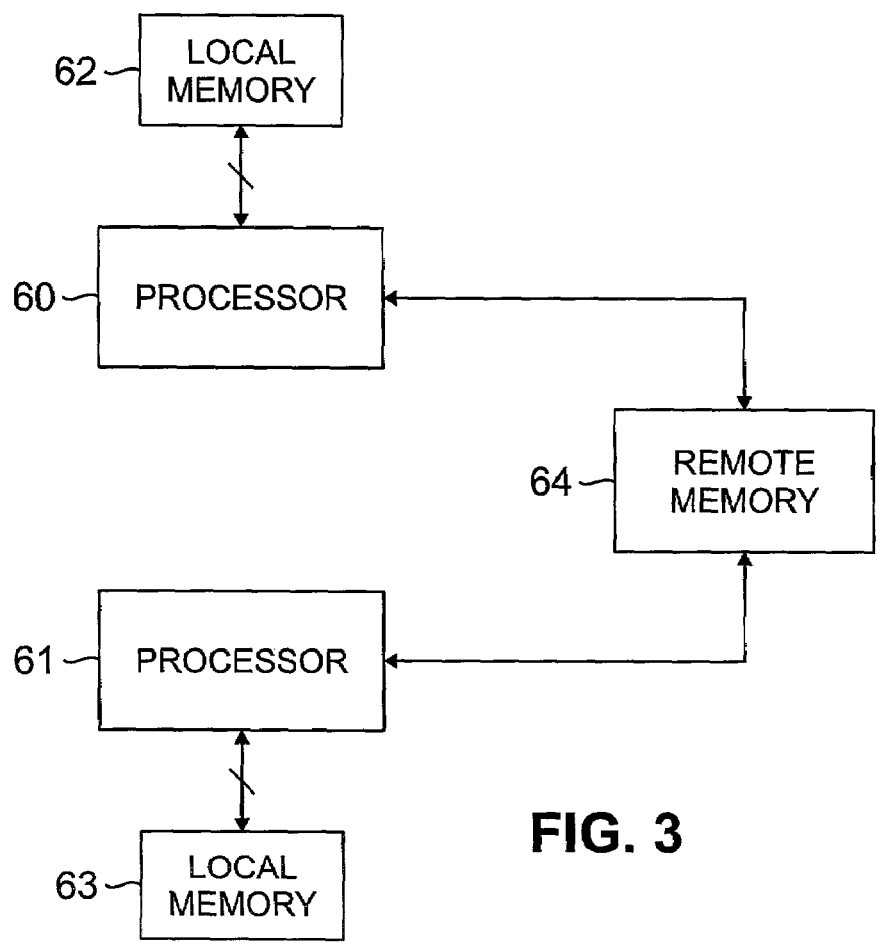

The teachings of the present invention can also be applied to parallel processing of tree structures. See FIG. 3 where processors 60 and 61 each have a local memory 62 and 63, respectively, for storing lower level tree branches, and a shared remote memory 64 for storing higher level tree branches. Each processor 60 and 61 includes an execution engine, each having an execution pipeline and a program memory. Thus, according to the embodiment of FIG. 3, each processor 60 and 61 can search its respective local memory for executing the tree search then access the shared remote memory 64 when the higher tree branches are encountered. In one embodiment, the local memories 62 and 63 are located on the same integrated circuit device as their respective processors 60 and 61, thus providing faster access times than the remote memory 64.

Figure 4:
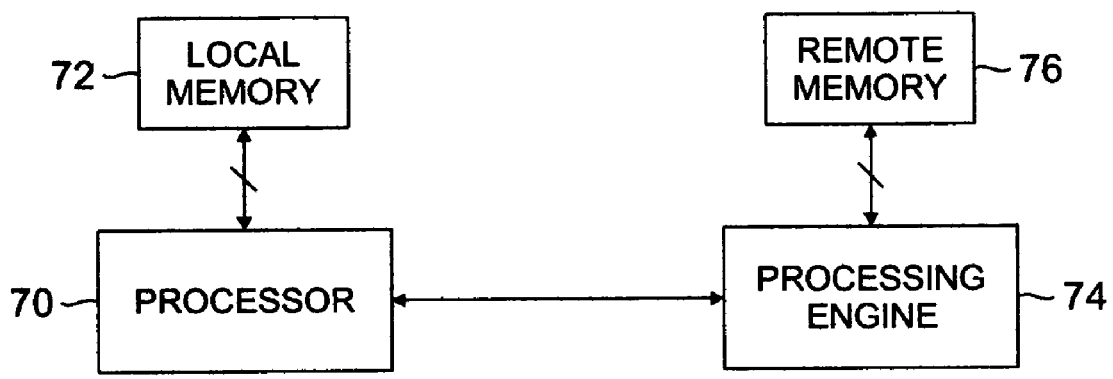

In the embodiment of FIG. 4, a processor 70 communicates with a local root memory 72 and a processing engine 74 communicates with an remote non-root memory 76. When a tree search references an instruction that is in the other engine's memory, the latter processor is given control over the searching process to execute that instruction. To provide faster memory access the local memory 72 is located on-chip with the processor 70.

In another embodiment, a search engine processor is multi-threaded, allowing it to execute a plurality of simultaneous searches throughout one or more search trees. For example, the processor 50 of FIG. 2 can fetch the tree structure information from the memories 52 and 54 in parallel, since each memory is accessible through a different processor thread, thereby reducing the time required to execute the classification process.

Figure 5:
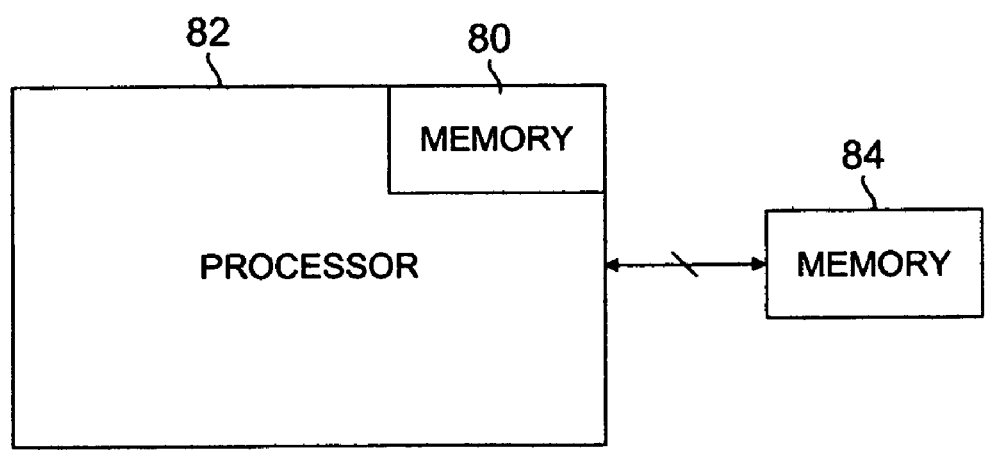

In another embodiment, as illustrated in FIG. 5, an internal memory 80 is included on the same chip as a processor 82, i.e., on-chip. An external memory 84 is located off-chip. In this embodiment, the lowest or root levels (for example, two levels) of the tree are stored in the internal memory 80, referred to as root tree memory. Since there are fewer tree branches at the root level, the capacity requirements for the internal memory 80 are lower than the capacity requirements for an equivalent number of upper level branches. The latter are stored in the external memory 84, which can run at a slower speed (resulting in a higher data latency). But this latency factor has less impact on the speed at which the tree analysis process is executed because these higher tree branches are not traversed as frequently. The use of internal memory and external memory allows each to be accessed in parallel by the pipelined processor 82. Also, use of the internal memory reduces the pin-out count of the integrated circuit incorporating the processor 82 and eliminates signal speed reductions due to impedance mismatches at the pin interfaces. In another exemplary embodiment the tree structure is stored in three memory elements, two memory elements external to the processor and the third on-chip.

It has been shown that the storage of the lower tree branches on-chip reduces the number of clock cycles required to traverse through an average size tree from about 30 to 40 clock cycles according to the prior art, to about two or three clock cycles according to the teachings of the present invention. Depending on the structure of the particular tree, many of the search processes may terminate successfully at a lower level branch in the on-chip memory, and thereby avoid traversing the upper level branches stored in the slower memory.

In yet another embodiment, it may be possible to store especially critical or frequently-used small trees entirely within the internal memory element 80. Thus providing especially rapid tree searches for any tree that is located entirely on-chip. The segregation between the tree levels stored within the internal memory 80 and the external memory 84 can also be made on the basis of the probabilities of certain patterns in the input data.

Typically, the data input to a network processor using a tree characterization process is characterized according to several different attributes. There will therefore be a corresponding number of trees through which segments of the data packet or data block are processed to perform the characterization function. According to the present invention, the lower level branches are stored on-chip and the higher-level branches are stored off-chip. To perform the multiple characterizations, a pipelined processor will access a lower branch of a tree stored in the on-chip memory and then move to the off-chip memory as the tree analysis progresses. But since the off-chip access time is longer, while waiting to complete the read cycle off-chip, the processor can begin to characterize another aspect of the input data by accessing the lower branches of another on-chip tree. In this way, several simultaneous tree analyses can be performed by the processor, taking advantage of the faster on-chip access speeds while waiting for a response from a slower off-chip memory.

In another embodiment, certain portions of the tree (not necessarily an entire tree level) are stored within different memory elements. For example, the most frequently traversed paths can be stored in a fast on-chip or local memory and the less-frequently traversed paths stored in a slower remote or external memory.

The tree according to the present invention is also adaptable to changing system configurations. Assume that the tree is processing a plurality of TCP/IP addresses. When the process begins the tree is empty and therefore all of the input addresses default to the same output address. The tree process begins at the root and immediately proceeds to the default output address at the single leaf. Then an intermediate instruction or decision node is added to direct certain input addresses to a first output address and all others to the default address. As more output addresses are added, the tree becomes deeper, i.e., having more branches or decision nodes. According to the teachings of the present invention, the growth of the tree can occur in both the local and the remote memory elements.

What is claimed is:

1. A computer-implemented method for retrieving an attribute associated with a data packet comprising a search object using a decision tree structure comprising a plurality of search nodes defining a plurality of paths through the decision tree structure, at least one path comprising a plurality of search nodes, one or more joining links between adjacent search nodes, and a leaf, said method comprising:
    storing a first portion of the decision tree structure in a first memory, having a first memory access time, wherein the first portion comprises a first set of one or more search nodes, zero or more joining links, and zero or more leaves;
    storing a second portion of the decision tree structure in a second memory, having a second memory access time, wherein the second portion comprises a second set of one or more search nodes, zero or more joining links, and one or more leaves, and wherein the first memory access time is less than the second memory access time;
    implementing one or more times, starting with a root search node in the first memory, the steps of:
        (1) reading at least a portion of one or more paths through a current search node from one of the first memory and the second memory;
        (2) comparing, the current search node, at least a portion of the search object with the at least a portion of the one or more paths through the current search node; and
        (3) based on a result of the step of comparing, traversing a search path from the current search node to:(i) a next search node via the joining link therebetween, or (ii) a leaf, wherein the search path terminates at the leaf providing the attribute associated with the data packet; and
    retrieving the attribute associated with the data packet.

2. The method of claim 1 wherein the search object comprises at least part of a destination address of the data packet.

3. The method of claim 1 wherein the step of reading is executed by a processor formed in an integrated circuit, and wherein the first memory is formed on the integrated circuit, such that the step of reading search nodes from the first memory executes faster than the step of reading search nodes from the second memory.

4. The method of claim 1 wherein the first portion of the decision tree structure comprises the search nodes near the root search node.

5. The method of claim 1 wherein the decision tree structure comprises a plurality of levels, each comprising a plurality of search nodes, and wherein the search nodes comprising one of the plurality of levels are connected to search nodes comprising another one of the plurality of levels by links.

6. The method of claim 5 wherein a predetermined number of lower levels of the plurality of levels are stored in the first memory, and wherein a remaining plurality of levels are stored in the second memory.

7. The method of claim 6 wherein the predetermined number of lower levels of the plurality of levels have a faster read access time than the remaining plurality of levels.

8. The method of claim 1 wherein the search object comprises a plurality of symbols.

9. The method of claim 8 wherein the symbols comprise a plurality of binary bits.

10. The method of claim 1 wherein the decision tree structure comprises a classification engine of a communications network processor for determining an attribute of data input thereto, and wherein the second portion of the decision tree ends in a plurality of leaves, the method further comprising repeating the steps of reading, comparing and traversing until a leaf is reached, wherein the leaf identifies the attribute of the input data.

11. The method of claim 1 wherein each one of the plurality of search nodes comprises an instruction and an address field, wherein the step of comparing further comprises comparing at least a portion of the search object with the instruction, and wherein the address field determines the next search node based on the comparing step.

12. The method of claim 1 wherein the decision tree structure comprises a plurality of contiguous tree levels, wherein each tree level further comprises a search node and link to a search node of the next adjacent tree level.

13. The method of claim 12 wherein the first portion of the decision tree structure comprises a predetermined number of contiguous tree levels and the second portion of the decision tree structure comprises the remaining contiguous tree levels.

14. The method of claim 12 wherein the first portion of the decision tree structure comprises a portion of one or more contiguous tree levels.

15. The method of claim 1, wherein the attribute associated with the data packet is presence or absence in the decision tree structure of a leaf that matches the search object.

16. The method of claim 1, wherein, if the search object does not match any leaf in the decision tree structure, then the retrieved attribute is absence in the decision tree of a matching leaf.

17. The method of claim 1, wherein the attribute associated with the data packet is a classification for the data packet, wherein the classification is associated with the leaf terminating the search path.

18. The method of claim 1, wherein:
each path terminates in a leaf;
the at least a portion of the search object is a single character; and
for at least one current search node, there are a plurality of paths through the current search node, and the at least a portion of the plurality of paths through the current search node comprises a plurality of single characters, each character from a different path through the current search node.

19. The method of claim 1, wherein:
each path terminates in a leaf; and
the decision tree structure comprises:
 a first type of path corresponding to a match of the search object; and
 a second type of path corresponding to a failure to match the search object.

20. An apparatus for retrieving an attribute associated with a data packet comprising a search object using a decision tree structure comprising a plurality of search nodes defining a plurality of paths through the decision tree structure, at least one path comprising a plurality of search nodes, one or more joining links between adjacent search nodes, and a leaf, said apparatus comprising:
 a first memory for storing a first portion of the decision tree structure, the first memory having a first memory access time;
 a second memory for storing a second portion of the decision tree structure, the second memory having a second memory access time wherein the first memory access time is less than the second memory access time; and
 a processor for retrieving the attribute associated with the data packet by implementing one or more times, starting with a root search node in the first memory, the steps of:
  (1) reading at least a portion of one or more paths through a current search node from one of the first memory and the second memory;
  (2) comparing, at the current search node, at least a portion of the search object with the at least a portion of the one or more paths through the current search node; and
  (3) based on a result of the step of comparing, traversing a search path from the current search node to: (i) a next search node via the joining link therebetween, or (ii) a leaf,
 wherein the search path terminates at the leaf.

21. The apparatus of claim 20 wherein the processor and the first memory are formed in the same integrated circuit, such that reading search entries from the first memory is faster than reading search entries from the second memory.

22. The apparatus of claim 20 wherein the decision tree structure comprises a plurality of levels, each comprising a plurality of search nodes, and wherein the search nodes comprising one of the plurality of levels are connected to search nodes comprising an adjacent one of the plurality of levels by a link, and wherein the first memory stores at least the first level.

23. An apparatus for retrieving an attribute associated with a data packet comprising a search object using a decision tree structure comprising a plurality of paths through the decision tree structure, at least one path comprising a plurality of search nodes, one or more joining links between adjacent search nodes, and a leaf, said apparatus comprising:
 a first processor for accessing a first memory;
 a second processor for accessing a second memory;
 the first memory having a first memory access time and for storing a first portion of the decision tree structure; and
 the second memory having a second memory access time and for storing a second portion of the decision tree structure wherein the first memory access time is less than the second memory access time,
 wherein said first processor and said second processor are for retrieving the attribute associated with the data packet by implementing one or more times, starting with a root search node in the first memory, the steps of:
  (1) reading at least a portion of one or more paths through a current search node from one of the first memory and the second memory;
  (2) comparing, at the current search node, at least a portion of the search object with the at least a portion of the one or more paths through the current search node;
  (3) based on a result of the step of comparing, traversing a search path from the current search node to: (i) a next search node via the joining link therebetween, or (ii) a leaf,
 wherein the search path terminates at the leaf.

24. The apparatus of claim 23 wherein the first processor compares at least a portion of the search object with one or more search nodes stored in the first memory to traverse through the first portion; and
 wherein after the first portion of the decision tree has been traversed, the second processor compares at least a portion of the search object with one or more search entries stored in the second memory to traverse through the second portion until a search node matching at least a portion of the search object is determined.

25. The apparatus of claim 23 wherein the first processor and the second processor simultaneously execute tree searches for a plurality of search trees.

26. Apparatus comprising:
 a first memory for storing a first portion of a decision tree structure, the first memory having a first access time;
 a second memory for storing a second portion of the decision tree structure, the second memory having a second access time greater than the first access time; and
 at least one processor for traversing a search path in the decision tree structure corresponding to a specified search object, wherein:
  the specified search object comprises (1) a first part contained in the first portion of the decision tree structure and (2) a second part contained in the second portion of the decision tree structure; and
  the at least one processor traverses (1) a first part of the search path by accessing the first memory to identify the first part of the specified search object and (2) a second part of the search path by accessing the second memory to identify the second part of the specified search object.

27. The invention of claim 26, wherein:
the first portion of the decision tree structure comprises one or more lower levels of the decision tree structure;
the second portion of the decision tree structure comprises one or more higher levels of the decision tree structure; and the first memory access time is less than the second memory access time.

28. The invention of claim 26, further comprising a third memory for storing the first portion of the decision tree structure, the third memory having a third access time different from the second access time, wherein the at least one processor comprises:

a first processor for traversing a first search path in the decision tree structure corresponding to a first specified search object, wherein:

the first specified search object comprises (1) a first part contained in the first portion of the decision tree structure and (2) a second part contained in the second portion of the decision tree structure; and the first processor traverses (1) a first part of the first search path by accessing the first memory to identify the first part of the first specified search object and (2) a second part of the first search path by accessing the second memory to identify the second part of the first specified search object; and a second processor for traversing a second search path in the decision tree structure corresponding to a second specified search object, wherein:

the second specified search object comprises (1) a first part contained in the first portion of the decision tree structure and (2) a second part contained in the second portion of the decision tree structure; and the second processor traverses (1) a first part of the second search path by accessing the third memory to identify the first part of the second specified search object and (2) a second part of the second search path by accessing the second memory to identify the second part of the second specified search object.

29. The invention of claim 28, wherein:

the first processor and the first memory are implemented on a first integrated circuit;

the second processor and the third memory are implemented on a second integrated circuit; and the second memory is not part of either the first or second integrated circuit.

30. The invention of claim 26, wherein the at least one processor comprises:

a first processor for traversing the first part of the search path by accessing the first memory to identify the first part of the specified search object; and a second processor for traversing the second part of the search path by accessing the second memory to identify the second part of the specified search object.

31. The invention of claim 30, wherein, after traversing the first part of the search path, the first processor passes control to the second processor to traverse the second part of the search path.

32. The invention of claim 30, wherein the first processor and the first memory are implemented on a single integrated circuit.

33. The invention of claim 26, wherein the at least one processor comprises a first processor for accessing simultaneously (1) the first portion of the decision tree structure in the first memory and (2) the second portion of the decision tree structure in the second memory.

34. The invention of claim 26, wherein:

the at least one processor comprises a first processor implemented on a first integrated circuit together with the first memory; and the second memory is not part of the first integrated circuit.

* * * * *

UNITED STATES PATENT AND TRADEMARK OFFICE
CERTIFICATE OF CORRECTION

| | |
|---|---|
| PATENT NO. | : 7,246,102 B2 |
| APPLICATION NO. | : 10/037040 |
| DATED | : July 17, 2007 |
| INVENTOR(S) | : Betty A. McDaniel et al. |

It is certified that error appears in the above-identified patent and that said Letters Patent is hereby corrected as shown below:

On the cover page, item [54] replace the title "METHOD OF IMPROVING THE LOOKUP PERFORMANCE OF THREE-TYPE KNOWLEDGE BASE SEARCHES" with --METHOD OF IMPROVING THE LOOKUP PERFORMANCE OF TREE-TYPE KNOWLEDGE BASE SEARCHES--.

Signed and Sealed this

Thirteenth Day of November, 2007

JON W. DUDAS
*Director of the United States Patent and Trademark Office*